United States Patent [19]
Koford

[11] Patent Number: 4,488,771
[45] Date of Patent: Dec. 18, 1984

[54] FLUOROSILICONE ELASTOMERS, METHOD OF MAKING SUCH ELASTOMERS AND ELECTRICAL CONNECTORS INCLUDING THE ELASTOMERS

[75] Inventor: Stuart K. Koford, Lombard, Ill.

[73] Assignee: Allied Corporation, Morris Township, Morris County, N.J.

[21] Appl. No.: 355,819

[22] Filed: Mar. 8, 1982

[51] Int. Cl.³ .............................................. H01R 3/00
[52] U.S. Cl. ........................... 339/278 D; 339/275 R; 524/520
[58] Field of Search ............... 525/185, 342, 479, 478, 525/359.1, 359.5; 524/266, 268, 506, 520; 339/278 C, 278 D, 275 R, 275 B, 59 R, 96 R, 275 C, 176 R, 176 L

[56] References Cited

U.S. PATENT DOCUMENTS

| | | | |
|---|---|---|---|
| 2,710,290 | 6/1955 | Safford et al. | 260/41 |
| 3,560,542 | 2/1971 | Kim et al. | 260/448.2 |
| 3,647,740 | 3/1972 | Loree et al. | 260/37 SB |
| 3,975,362 | 8/1976 | Kim et al. | 260/46.5 G |
| 3,989,668 | 11/1976 | Lee et al. | 260/46.5 G |
| 4,029,629 | 6/1977 | Jeram | 260/37 SB |
| 4,032,502 | 6/1977 | Lee et al. | 260/375 B |
| 4,100,136 | 7/1978 | Carter et al. | 525/478 |
| 4,162,243 | 7/1979 | Lee et al. | 260/37 SB |
| 4,303,572 | 12/1981 | Hatanaka | 260/37 SB |

FOREIGN PATENT DOCUMENTS

| | | |
|---|---|---|
| 51369 | 12/1982 | European Pat. Off. |
| 755762 | 8/1956 | United Kingdom |
| 1541689 | 3/1979 | United Kingdom |

*Primary Examiner*—Josephine L. Barr
*Attorney, Agent, or Firm*—Roger H. Criss

[57] ABSTRACT

Fluorosilicone elastomeric compositions, and electrical connectors including inserts molded from such compositions, formed of an organosilicone polymer and a telomer of a solid particulate organofluoro compound, preferably tetrafluoroethylene, dispersed in the silicone polymer.

12 Claims, 1 Drawing Figure

U.S. Patent  Dec. 18, 1984  4,488,771
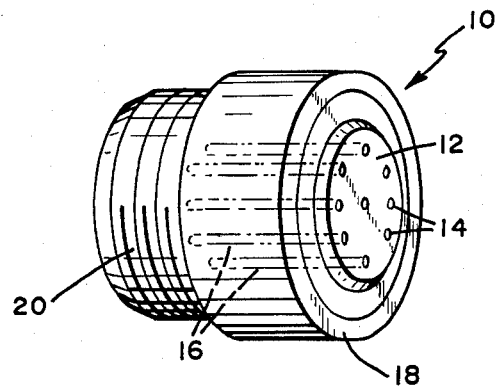

FLUOROSILICONE ELASTOMERS, METHOD OF MAKING SUCH ELASTOMERS AND ELECTRICAL CONNECTORS INCLUDING THE ELASTOMERS

BACKGROUND OF THE INVENTION

Fluorosilicone elastomeric compositions have heretofore have been developed for a variety of end uses. For example, such compositions have been used to produce inserts for electrical connectors with generally good results. However, most of the commercially available fluorosilicones are in the form of gums which necessitate labor intensive processing techniques. Although some liquid injection molding fluorosilicone compositions are commercially available, such compositions presently are very expensive due to complex synthesis required to prevent unzipping of the fluoro group (e.g., trifluoropropyl) from an adjacent siloxane group. Examples of fluorosilicone compositions are those described in U.S. Pat. Nos. 4,029,629; 4,032,502 and 4,100,136.

Furthermore, existing fluorosilicone compositions exhibit solvent resistance and high temperature resistance which are not as high as necessary for certain high performance environments, such as in electrical connectors for use in aircraft.

It would be desirable to provide a fluorosilicone elastomer composition that was easily processable by high speed molding techniques, such as liquid injection molding, that had improved properties and reduced costs, as well as electrical connectors including components molded from such compositions. Furthermore, it would be desirable to provide a method of preparing and curing such compositions.

SUMMARY OF THE INVENTION

It has now been discovered that fluorosilicone elastomeric compositions and electrical connectors including inserts molded from such compositions and having improved properties can be obtained from commercially available organopolysiloxane compositions with the addition of a fluorocarbon telomer in solid particulate form prior to the molding operation. Hence, there is no need to form copolymers of a fluoro compound and a polysiloxane prior to processing the polymers into useful objects.

In accordance with this invention, there is provided in an electrical connector comprising an outer housing, an insert within said housing and having aperture means therein and electrical contact means in communication with said aperture means, the improvement comprising:

the insert being formed of an elastomeric material comprising a two-phase composition formed of an organosilicone polymer having dispersed therein a telomer of an organofluoro compound in solid particulate form.

In addition, this invention provides a fluorosilicone molding composition comprising an organopolysiloxane, a cross-linking agent for the organopolysiloxane and a fluorine-containing composition comprising a telomer of an organofluoro compound in solid particulate form. Preferably, the telomer is dispersed in a siloxane carrier together with a low viscosity silicone fluid, preferably a dimethylsiloxane fluid.

In further accordance with this invention, there is provided a process for the manufacture of fluorosilicone elastomers comprising the steps of (a) forming a liquid mixture of (1) an organosiloxane polymer and a cross-linking agent therefor and (2) a fluorine-containing composition comprising a telomer of an organofluoro compound in solid particulate form; (b) injecting the liquid mixture into a molding machine;

(c) heating the mixture in the molding machine for a sufficient time to convert the organosiloxane polymer to a silicone elastomer and (d) removing the cured elastomer from the molding machine in the form of a two-phase composition of the silicone elastomer having the telomer dispersed therein. Preferably, the telomer is a tetrafluoroethylene telomer and is dispersed in a polysiloxane carrier. Also, the process further preferably includes the addition of a low viscosity silicone fluid to the mixture and the step of removing the fluid from the formed article.

In further accordance with this invention, there is provided a method of controlling the swelling of elastomeric products selected from the group consisting of fluorosilicone elastomers and silicone elastomers comprising the steps of forming a mixture of an organopolysiloxane, curing agent therefor and optionally a telomer of an organofluorocompound in solid particulate form, together with a low viscosity silicone fluid, preferably dimethylsiloxane, heating the mixture to an elevated temperature for a time sufficient to convert the organopolysiloxane to a silicone elastomer and removing the silicone fluid.

BRIEF DESCRIPTION OF THE DRAWINGS

The sole FIGURE of the drawings is a perspective view of an electrical connector including a fluorosilicone elastomer insert.

DESCRIPTION OF THE PREFERRED EMBODIMENTS

In formulating the organosilicone polymer useful in this invention, any of the commercially available silicones may be employed and preferably the precursors are in liquid form. As is generally known, curable silicone compositions may be formed from a polyorganosiloxane and a cross-linking agent therefor, with the cross-linking agent providing a silicon hydride cure. Preferably, the curing agent is a polyorganohydrogensiloxane. The curable silicone composition preferably includes a platinum catalyst and a cure inhibitor. Examples of such compositions are those described in U.S. Pat. No. 4,303,572 to Hatanaka et al (except for the metal powder), the disclosure of which is expressly incorporated herein by reference.

In general, the polyorganosiloxane contains a vinyl group, and preferably at least two vinyl radicals bonded to silicon atom(s). The siloxane chains may be linear, branched or cyclic. As other organic radicals that may be bonded to the silicon atoms, there may be $C_1$ to $C_{10}$ lower alkyl; aryl such as phenyl; and aralkyl such as beta-phenylethyl. Fluorinated hydrocarbon radicals need not be present as required in prior art compositions which form polymers including such radicals as part of the polymer chain. It is most preferred to employ methyl radicals as the organic radical and most preferably the polyorganosiloxane is a polydimethylsiloxane containing vinyl radicals. The molecular terminals of such polymer may be blocked by dimethylvinyl radicals. The number of repeating units in the polymer may range, for example, from 100 to 1,000 or more. This component is preferably utilized in a liquid form.

As the cross-linking agent, a polyorganohydrogensiloxane is preferred which may have linear, branched or cyclic siloxane chains. In general, more than two hydrogen atoms (on the average) bonded to silicon atom(s) are required to form a cross-linked network. As the organic radicals bonded to the silicon atom(s), there may be utilized those radicals mentioned above for the polyorganosiloxane as well as vinyl radicals. Preferably, the organic radical is methyl and the degree of polymerization is between about 4 and 3,000. Most preferred is a dimethylhydrogensiloxane. The cross-linking agent is also preferably in liquid form and may be employed in the amount of about 0.1 to 10 weight percent based on the weight of the polyorganosiloxane.

It is preferred to employ a platinum catalyst such as chloroplatinic acid or an adduct thereof, although other generally employed platinum catalysts, such as a platinum-phosphorus complex or a bis(acetylacetonato) platinum may be used. Such catalysts are described in the aforementioned Hatanaka patent as well as in U.S. Pat. Nos. 3,989,668 and 4,162,243 to Lee et al, the disclosures of which are expressly incorporated herein by reference. The catalysts are employed in standard catalytic amounts, such as 0.1 to 1,000 ppm based on the polyorganosiloxane. Preferably, the composition includes a platinum catalyst inhibitor which is well known in the art, such as the acetylenic compounds described in the aforementioned Lee et al patents.

As is generally known, the components of the curable silicone polymer are typically packaged in two parts, one containing the polyorganosiloxane, catalyst and cure inhibitor and the other the polyorganosiloxane and polyorganohydrogensiloxane. Standard fillers, such as silica and the like, may also be included in such compositions.

In accordance with this invention, a telomer of an organofluoro compound in solid particulate form is employed as a source of fluorine for the composition. Such telomers are commercially available and preferably are perfluorinated hydrocarbons, such as tetrafluoroethylene (TFE), although telomers of trifluoropropylene may also be utilized. By the term telomer, there is meant a low molecular weight fluorocarbon resin, as is known is the art, such as a low molecular weight TFE resin. Such telomers are generally in the form of friable particles which can be reduced in size after processing in liquid media. They have high surface energies. The TFE telomer may typically have a number average molecular weight in the range of up to 100,000, for example. The melt index may range from about 0.02 to 2, for example. Particle sizes may be in the range of about 1 to 10 microns prior to processing. The TFE telomer is present in an amount, for example, of about 1 to 25 weight percent, based on the total of the composition, and preferably in the range of about 5 to 15 percent.

It is preferred to introduce the TFE telomer to the silicone polymer components in the form of a liquid composition containing a carrier that is compatible with the silicone polymer components. Preferably, a reactive carrier is employed and preferably the carrier is a vinyl functional siloxane also containing a platinum catalyst. The carrier is likewise present in an amount of about 1 to 25 weight percent based on a total weight of the composition, and preferably 5 to 15 weight percent.

As mentioned above, it has been found that the presence of a low viscosity silicone fluid provides excellent control of swelling during the molding of the composition. Such fluids may be employed in viscosities ranging from 0.65 to 20 centistokes at 25° C., but it is preferred that the fluid have a viscosity in the range of about 5 to 15, most preferably about 10 centistokes. The silicone fluid preferably is a dimethylsiloxane fluid although a phenylmethylpolysiloxane may also be employed. The silicone fluid is preferably present as a component of the TFE telomer composition and may be present in an amount of about 0.1 to 5 weight percent, more preferably about 1 to 2 weight percent, based on the total weight of the curable fluorosilicone composition. Although it is preferred to work with fluorosilicone compositions, the low viscosity silicone fluids may also be used with standard silicone resins.

The composition may also include conventional pigments, fillers, mold-release agents and other additives.

Preferably, the composition is mixed and cured in a liquid molding operation under standard molding conditions. Most preferably, three separate fluid compositions, namely the polyorganosiloxane, the cross-linking agent and the TFE composition, are separately fed to a liquid molding machine where they are intermixed. The die cavity is chosen to provide the desired part. Curing temperatures may range from about 350° to 475° F., for example, and pressures of about 500 to 1500 psi. Mold times may typically run from about 5–30 seconds for liquid injection molding.

Directly following the molding operation, some of the dimethylsiloxane fluid may be driven off. The rest is driven off in a standard post cure heating operation, which typically may range from about 1 to 8 hours at 400° to 500° F.

With reference to the drawing, there is shown an electrical connector, indicated at 10, of the female type including an insert 12 formed of the fluorosilicone elastomer of this invention. Insert 12 provides an environmental seal in use and has a plurality of apertures 14 that mate with metal contacts 16. Insert 12 is enclosed, as is conventional, in housing 18 which is provided with a mechanical connecting means 20 at its end opposite to insert 12. Connector 10 is adapted to mate with a male connector of a similar type.

The following non-limiting example is given in further description of the present invention.

EXAMPLE

A fluorosilicone composition was prepared by mixing (in parts by weight) (1) 50 parts of a liquid vinyl end-blocked polydimethylsiloxane containing a chloroplatinic acid catalyst system, treated silica filler and cure inhibitor, (2) 50 parts of a liquid vinyl end-blocked polydimethylsiloxane containing treated silica filler and a liquid polyhydrogensiloxane cross-linking agent, and (3) 30 parts of a TFE composition. Components 1 and 2 are commercially available from General Electric as silicone rubber 2300, parts A and B. Both parts A and B have a viscosity of 1,000,000 cp and a specific gravity of 1.26. When cured, they provide an elastomer having a durometer of 36, a tensile strength of 800 psi, an elongation of 300%, a tear strength (Die B) of 130 lbs/in and a 25% compression set after 22 hours at 175° C. of 50%.

Component 3 was prepared by mixing 49.5 weight percent (based on the total weight of the component) of a telomer of TFE, 2 weight percent of a dimethylsiloxane fluid, 44 weight percent of a siloxane carrier, 4 weight percent of pigment and 0.5 percent of a heat stabilizer. As the telomer, there was employed a solid particulate material having a median particle size of 4 microns (by optical measurement), a specific gravity of 2.2 and a melting point of 327° C. This material can be broken down during processing to a very small particle size (e.g., 0.1 to 1 micron) without agglomerating. The TFE had a melt index of 0.04 grams per 10 min. per ASTM D 1238-65T (360° C., 2160 gram weight) and a number average molecular weight of 10,000-20,000 based on the heat of fusion and crystallization method of Suwa et al., Journal of Polymer Science (Polymer Physics Ed.) Vol 13, p. 2183 (1975). The dimethylsiloxane fluid had a viscosity at 25° C. of 10 centistokes. The carrier was a vinyl functional dimethylpolysiloxane also in fluid form and containing a platinum catalyst. The three components were separately introduced to an liquid molding machine where they were molded into electrical connector inserts at a temperature of 450° F. for 15 seconds and a pressure of 1200 psi. The samples were post cured at 400° F. for one hour and then at 450° F. for three hours.

Samples of the composition were also transfer molded on a laboratory press at 400° F. for 3 minutes at 1200 psi, and then post cured as above. The properties of the molded samples were as follows:

| Durometer | 37 |
| --- | --- |
| Elongation after post cure | 550% |
| Tear Strength | 75 lbs./in. |
| Volume Swell in Monsanto LD phosphate ester fluid after 24 hrs. at 70° C. and 24 hrs. dry | 16% |
| Resistance after Monsanto LD Swell Test | $9 \times 10^8$ ohms |
| Volume Swell in Jet Fuel A after 24 hrs. at 70° C. and 24 hrs. dry | 165% |

In comparison, parts were molded from a fluorosilicone gum elastomer containing dimethylsiloxane having substituted trifluoropropyl units. Parts molded from the example of this invention exhibited a 4 times improvement in the fluid resistance based on the Monsanto LD fluid and a 16 times improvement in insulation resistance.

What is claimed is:

1. In an electrical connector comprising an outer housing, an insert within said housing and having aperture means therein and electric contact means in communication with said aperture means, the improvement comprising:
   said insert being formed of an elastomeric material comprising a two-phase composition formed of an organosilicone polymer having dispersed therein a telomer of an organofluoro compound selected from the group consisting of perfluorinated hydrocarbons, said telomer being present in solid particulate form and having a particle size in the range of about 1 to 10 microns prior to processing.

2. The electrical connector of claim 1 wherein said organosilicon polymer is the reaction product of a dimethylpolysiloxane and polymethylhydrogensiloxane and said telomer is a telomer of tetrafluoroethylene.

3. The electrical connector of claim 1 wherein said telomer is present in an amount of about 5 to 15 percent by weight, based on the total weight of said composition.

4. The electrical connector of claim 1 wherein said telomer is selected from the group consisting of tetrafluoroethylene and trifluoropropylene.

5. The electrical connector of claim 4 wherein said telomer is a telomer of tetrafluoroethylene.

6. The electrical connector of claim 5 wherein said organosilicone polymer is the reaction product of a polyorganosiloxane and a polyorganohydrogensiloxane.

7. The electrical connector of claim 6 wherein said polyorganosiloxane is a polydimethylhydrogensiloxane.

8. The electrical connector of claim 7 wherein said polydimethylsiloxane is end-blocked by vinyl radicals and said polymethylhydrogensiloxane is a polydimethylhydrogensiloxane.

9. The electrical connector of claim 5 wherein said telomer is present in an amount of about 1 to 25 weight percent, based on the total weight of said composition.

10. The electrical connector of claim 9 wherein said telomer is present in an amount of about 5 to 15 weight percent, based on the total weight of said composition.

11. The electrical connector of claim 10 wherein the melt index of said telomer is in the range of about 0.02 to 2.

12. The electrical connector of claim 11 wherein said organosilicone polymer is the reaction product of a polydimethylsiloxane and a polydimethylhydrogensiloxane.

* * * * *